United States Patent [19]

Chadwick et al.

[11] 4,175,587
[45] Nov. 27, 1979

[54] FUEL INJECTION SYSTEM AND CONTROL VALVE FOR MULTI-CYLINDER ENGINES

[75] Inventors: Alexander Chadwick, South Lyon; Magdi K. Khair, Birmingham; Jay C. McCombie, W. Bloomfield, all of Mich.

[73] Assignee: Chrysler Corporation, Highland Park, Mich.

[21] Appl. No.: 846,756

[22] Filed: Oct. 31, 1977

[51] Int. Cl.² ........................................... F02M 51/00
[52] U.S. Cl. ......................... 137/625.65; 123/32 AE; 123/139 E; 137/625.27; 239/99; 239/124; 239/585
[58] Field of Search ................... 123/32 AE, 139 E; 137/625.27, 625.5, 625.65; 239/99, 124, 585

[56] References Cited

U.S. PATENT DOCUMENTS

| | | | |
|---|---|---|---|
| 3,283,783 | 11/1966 | Kent | 137/625.5 X |
| 3,323,583 | 6/1967 | Crowther | 137/627.5 X |
| 3,646,969 | 3/1972 | Stampfli | 137/627.5 |
| 3,777,977 | 12/1973 | Regneault et al. | 239/585 X |
| 3,927,652 | 12/1975 | O'Neill | 123/32 AE X |

FOREIGN PATENT DOCUMENTS

1252027 10/1967 Fed. Rep. of Germany ...... 137/625.27

Primary Examiner—Gerald A. Michalsky
Attorney, Agent, or Firm—Baldwin & Newtson

[57] ABSTRACT

A fuel injection system and control valve are disclosed for use with a multi-cylinder engine such as a diesel or proco type engine. The disclosed control valve, which is of the piezoelectric type, controls the fuel injection into the individual cylinders by being connected in fluid circuit between the high pressure pump and distributor which are contained in the pump and distributor assembly. The control valve contains novel features providing improvements in the system.

4 Claims, 10 Drawing Figures

FUEL INJECTION SYSTEM AND CONTROL VALVE FOR MULTI-CYLINDER ENGINES

BACKGROUND AND SUMMARY OF THE INVENTION

This invention pertains to engine fuel systems and is particularly concerned with a novel fuel injection system and control valve.

The disclosure contains a number of novel features which contribute to improvements in a fuel injection system. One feature of the invention is that a retraction capability is provided in the single control valve which controls the fuel injection to the individual injectors in cooperation with a fuel pump and distributor assembly. The retraction feature provides for the draining of excess fuel in the circuit between the high pressure pump and the injector nozzles upon termination of each injection pulse whereby high pressures in the line are relieved to acceptable limits. Specific features of the invention relate to the particular disclosed construction of the control valve including the retraction valve structure incorporated into the control valve. These features, along with additional features, advantages and benefits of the invention, will be seen in the ensuing description and claims which are to be considered in conjunction with the accompanying drawings. The drawings disclose a preferred embodiment of the invention according to the best mode presently contemplated in carrying out the invention.

DESCRIPTION OF THE PREFERRED EMBODIMENT

Figure 1:
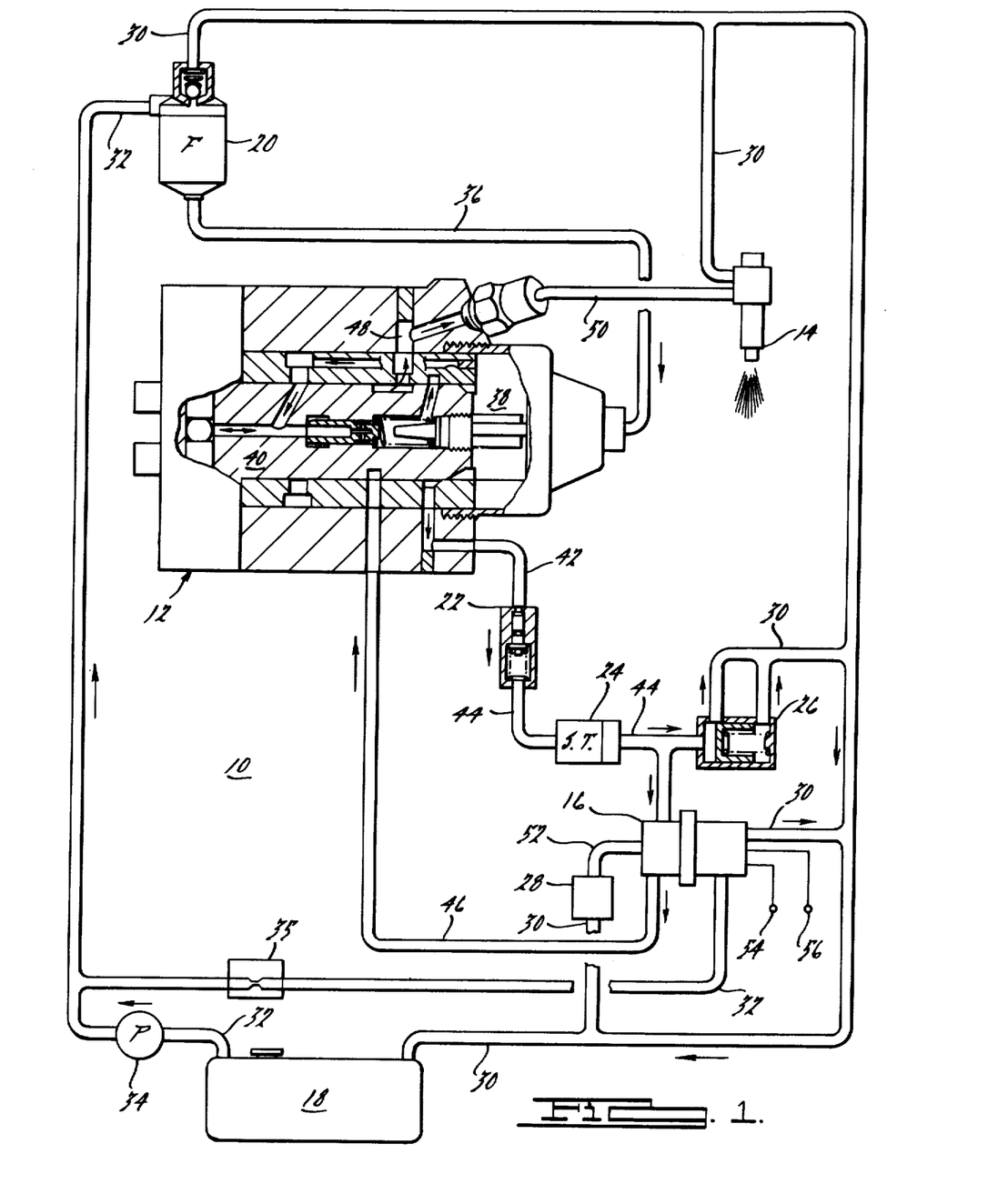
FIG. 1 is a schematic diagram illustrating a fuel injection system embodying principles of the present invention.

In FIG. 1 there is disclosed a fuel injection system 10 embodying principles of the present invention. The main elements of system 10 comprise a pump and distributor assembly 12, a plurality of nozzles 14, which correspond in number to the number of cylinders of the engine with which the system 10 is used, (only one nozzle is shown in the drawings for sake of clarity), a control valve 16 and a fuel tank 18. Also included in the system are a filter assembly 20, a check valve 22, a surge tank 24, a high pressure regulator valve 26, and a low pressure regulator valve 28. A drain line 30 connects to a number of these components for draining fuel back to tank 18. A supply line 32 which may include a supply pump 34 supplies fuel from tank 18 to certain of the components; particularly, the supply line 32 connects to the inlet of filter 20 and to one inlet of control valve 16 through a flow control orifice 35. A line 36 connects from the outlet of filter 20 to the inlet of the low pressure, or boost, pump section 38 of pump and distributor assembly 12. The boost pump 38 serves to boost the pressure of the fuel received from pump 34 and supplies fuel to the high pressure pump section 40 of pump and distributor assembly 12. The high pressure pump section 40 pressurizes the fuel even further and delivers this high pressurized fuel via a line 42 to the inlet of check valve 22. The outlet of check valve 22 in turn connects via a line 44 through a series surge tank 24 to another inlet of control valve 16. Surge tank 24 serves to dampen pump pulsations and provide delivery of adequate volumes of pressurized fuel to the engine when injection occurs. The high pressure regulator valve 26 is also connected to line 44 and serves to regulate the pressure of the fuel at this point in the system. Another line 46 connects the outlet of control valve 16 to the distributor section 48 of pump and distributor assembly 12. Briefly, when valve 16 is actuated, fuel is delivered from the pump and distributor assembly 12 via the lines 42, 44 through check valve 22 and surge tank 24 to control valve 16, and flows through valve 16 and out line 46 back to assembly 12. Each injector 14 is connected to an appropriate outlet of the distributor section 48 by means of a line 50 whereby each injector 14 is sequentially hydraulically connected in circuit with the pressurized supply of fuel when valve 16 is actuated. Another outlet of control valve 16 connects via a line 52 to the low pressure regulator valve 28 to reduce a pressure in nozzle line 50 to prevent after-injections, as will be explained more fully later in the description.

Figures 2, 3, 4:
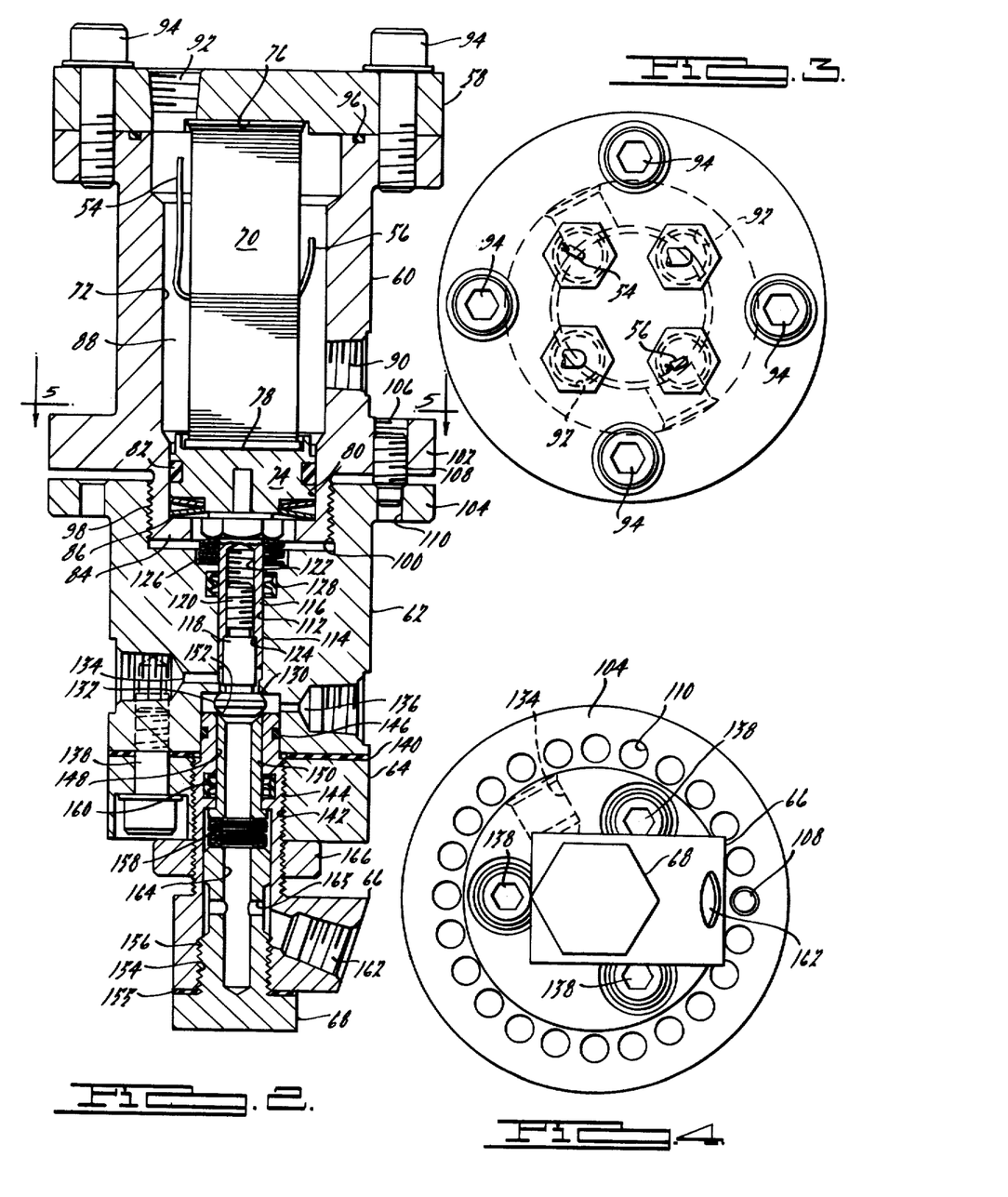
FIG. 2 is a longitudinal sectional view taken through the control valve used in the system of FIG. 1.
FIG. 3 is a top view of the control valve of FIG. 2.
FIG. 4 is a bottom view of the control valve of FIG. 2.

The pump and distributor assembly 12 is a conventional commercially available unit which has been slightly modified. In the commercially available unit the connection from the high pressure section to the distributor section is contained internally of the assembly. However, control valve 16, in the illustrated embodiment is external to assembly 12 and therefore the commercially available assembly 12 is modified to the extent of separating the internal connection between the distributor and the high pressure pump outlet and making these available for external connection whereby the outlet of the pump may be fed out through the circuit comprised of line 42, check valve 22, line 44, including the surge tank, control valve 16 and line 46 back to inlet of the distributor section 48. The assembly 12 is driven by the engine and is so synchronized therewith that the injectors 14 are selectively connected in sequence to valve 16. As will be explained in greater detail hereinafter, control valve 16 is electrically controlled by a control signal applied to the input terminal leads 54, 56 so that the precise amount of fuel and the timing thereof in relation to the cylinder operating cycle is electrically controlled. Thus, the invention provides an improvement in the control and operation of the fuel injection system of the engine. With this description of the system, attention can now be directed to details of control valve 16 as shown in FIGS. 2, 3, and 4.

Control valve 16 may be considered as comprising a number of valve body elements including a first element 58, a second element 60, a third element 62, a fourth element 64, a fifth element 66 and a sixth element 68. The second element 60 is of generally tubular shape and includes an electro-expansive actuator 70 disposed within the bore 72 thereof. The electro-expansive actuator 70 is in the form of a piezoelectric stack containing a plurality of individual piezoelectric discs constructed in accordance with known techniques. The electro-expansive actuator is intended to be electrically energized by the application of an electrical potential across the leads 54, 56 supplied from an external source. When so energized, the electro-expansive actuator expands axially a predetermined amount thereby providing the actuation for the control valve. The use of a piezoelectric stack is particularly advantageous in that a large actuating force can be developed with a short response time. A piston 74 is disposed for axial displacement by actuator 70, the actuator having its upper end lodged within a recess 76 in the first element 58 and its other end lodged within a recess 78 in the upper face of piston 74. Piston 74 is disposed for a close sliding fit within the bore section 80 of element 60. A suitable O-ring seal 82 is lodged in a corresponding groove extending circumferentially around the outside of piston 74 to provide for sealing of the piston within respect to the bore 80. A radially inwardly directed circumferential flange 84 is provided at the lower end of element 60 and is disposed radially inwardly of bore 80. A set of Belleville springs 86 is disposed as shown in the drawing between flange 84 and piston 74 tending to bias the latter upwardly toward actuator 70, as viewed in FIG. 2. It will be observed that the overall diameter of actuator 70 is somewhat less than the inside diameter of bore 72 so that an annular space 88 is provided around the outside of the actuator. An inlet port 90 is provided in the side wall of element 60 and a pair of outlet ports 92 in element 58 so that cooling liquid may be circulated within the space 88 to absorb heat from the actuator 70 during operation of the valve. Element 58 forms a top or cover for the valve and is assembled to element 60 by means of a plurality of bolts 94 which are passed through suitable holes in element 58 to engage registering tapped holes in the flange disposed around the outside of the upper end of element 60. An O-ring seal 96 is disposed in a corresponding groove around the outside of bore 72 in the top face of element 60 to be compressed between elements 58 and 60 as the bolts 94 are tightened to thereby seal around the upper end of space 88 between the two elements 58 and 60.

Figure 5:
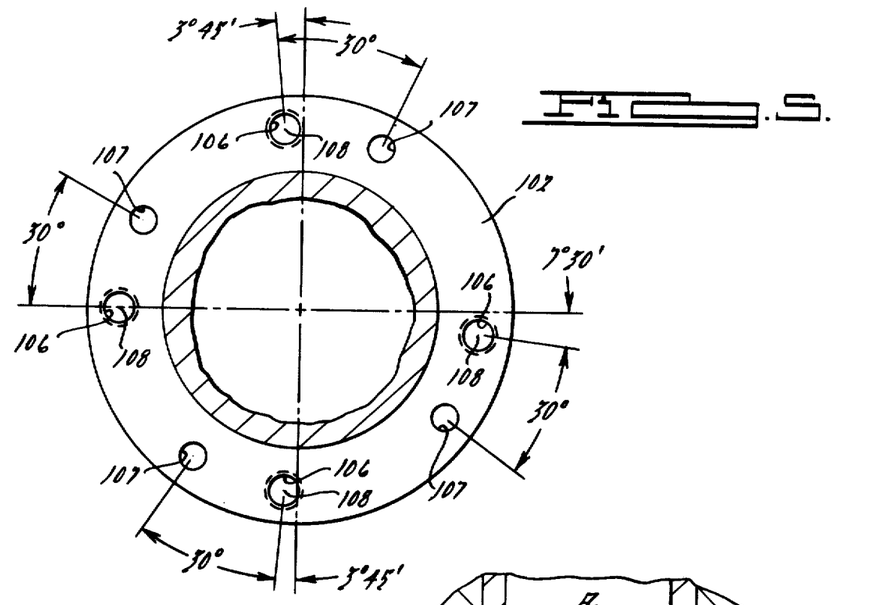
FIG. 5 is a sectional view taken in the direction of arrows 5—5 in FIG. 2.

The lower end of element 60 includes a reduced diameter section whose outside diameter is provided with a thread 98. A threaded counterbore 100 is provided at the upper end of element 62 with the two elements 60 and 62 being threaded together by means of the threads 98 and 100. This threaded attachment provides for relative axial adjustment between the two elements 60 and 62 and provides an advantageous way to adjust the operating elements of the valve as will be explained in greater detail hereinafter. Once the desired axial adjustment has been attained, the two elements 60 and 62 are locked together to prevent relative rotation. The locking arrangement is provided at the matching opposed flanges 102 and 104 of the two elements 60 and 62 respectively. Flange 102 extends circumferentially around the outside of the wall of element 60 and includes four threaded holes 106 and four adjacent locating holes 107 (see FIG. 5) extending completely through flange 102 and parallel to the axis of the valve, each locating hole 107 being associated with a corresponding hole 106. Both types of holes 106, 107 are centered on a common circuit which itself is concentric with the valve axis. The angular relationship between the threaded holes 106 and locating holes 107 is shown in FIG. 5. Each of four set screws 108 is threaded into a corresponding hole 106 and may be adjusted by means of an appropriate tool (such as by a a hexagonal wrench) engaging the upper end of the set screw as viewed in FIG. 2. A plurality of equally circumferentially spaced holes 110 are provided in flange 104 as shown in FIG. 4. The holes 110, which are of like diameter, are centered at 15° intervals on a common circle which is concentric with the valve axis and of the same diameter as the circle on which holes 106, 107 are centered. With the lower end of the set screws 108 disposed vertically above the upper surface of flange 104, the two elements 60 and 62 may be freely relatively rotated with respect to each other to perform the axial adjustment. If, once the desired adjustment has been attained, one of the locating holes 107 is in alignment with one of the holes 110, the threaded hole 106 associated with that one locating hole 107 is also in alignment with one of the holes 110 so that the set screw 108 in the associated threaded hole 106 may be advanced to insert the lower end thereof into the corresponding aligned hole 110 thereby locking the two elements 60 and 62 together. If one of the locating holes 107 is in alignment with a hole 110, the two elements 60 and 62 may be relatively rotated to bring the next nearest hole 110 into alignment with one of the four holes 107. The set screw 108 in the corresponding hole 106 is then advanced to insert the lower end thereof into the corresponding hole 110 thereby locking the two elements 60 and 62 together. By providing a plurality of holes 110 at uniform 15° increments around flange 104 and the offset threaded holes 106 and adjacent holes 107 around flange 102 in the pattern illustrated, the two elements 60 and 62 are angularly positionable for locking the increments of 3° 45′ of rotation. For a given pitch of thread of 40 threads per inch this means that adjustments in the range of 0.25 thousands of an inch can be attained.

Element 62 is also of generally tubular shape comprising a throughbore containing a number of bore sections. Disposed within the bore section 112 is the valve element 114. Valve element 114 is constructed from a first piece 116 and a second piece 118. The two elements 116, 118 are assembled together by providing a threaded stud section 120 on piece 118 which is threaded into a bore section 122 provided in the shank of piece 116. The two pieces are threaded together until the shoulders abut each other as indicated at 124. The upper end of piece 116 is provided with a hexagonal head and the lower end of piece 118 is provided with a hexagonal socket in the lower face thereof, both of which permit the use of fastening tools to tighten the two pieces 116, 118. If desired, a locking arrangement such as a nylon insert may also be provided to assist in locking the two pieces together after they have been fully tightened. Preparatory to assembly of the two pieces, a set of Belleville springs 126 is disposed over the shank of piece 116 so that when assembled the springs 126 engage the head of the valve element to bias same upwardly as viewed in FIG. 2. A high pressure seal, such as a T-seal, 128 is provided as shown to seal around the valve element 114. A valve seat 130 is provided at the lower end of bore section 112 and the head 132 of the valve 114 (provided by the second valve piece 118) is caused to seat on seat 130 because of the upward bias imparted to valve element 114 by springs 126. As shown in FIG. 2, valve element 114 is positioned with head 132 seated on seat 130; however, with the valve properly adjusted the lower face of piston 74 is disposed as close as possible to the head of valve element 114, with the electro-expansive actuator 70 not energized, without causing the valve head 132 to unseat from seat 130. Because of the fine adjustment feature described above, it will be appreciated that essentially the full displacement of piston 74, when actuated by energization of electro-expansive actuator 70, will be imparted to valve 114.

Figure 6:
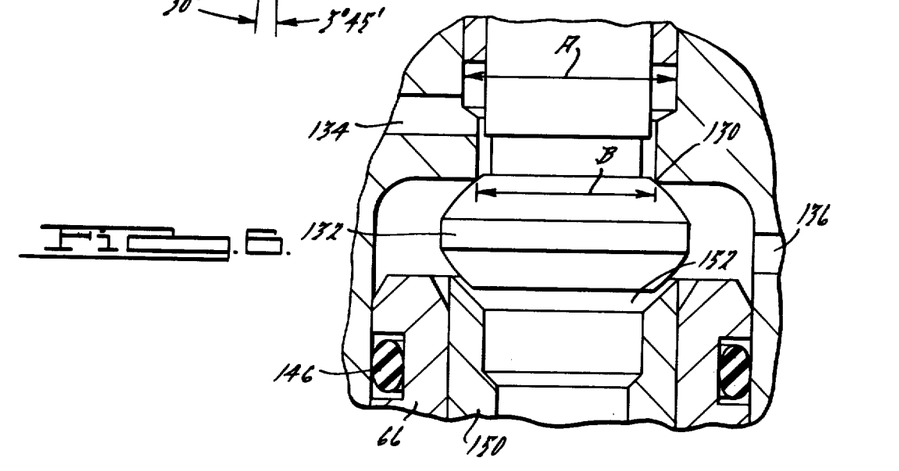
FIG. 6 is an enlarged fragmentary view of a portion of FIG. 2.

Valve 114 serves to control flow between an inlet 134 and an outlet 136 which are both provided in the side walls of element 62. The inlet 134 intersects the bore section 112 at a location which is above seat 130 as viewed in FIG. 2 and outlet port 136 intercepts the enlarged bore section at a point below seat 130. Thus, when valve 114 is open (i.e., unseated from seat 130) flow is permitted from inlet 134 to outlet 136, and when valve 114 is closed (i.e., seated on seat 130), the flow is blocked. As can be seen in greater detail in FIG. 6, the diameter across seat 130 (dimension B) is less than the diameter across bore 112 (dimension A). Thus, when actuator 70 is de-energized, fluid pressure acting on valve 114 will exert an upward force tending to close the valve. This is an advantageous feature since it promotes positive shut-off of flow to the injectors upon de-energization of the actuator.

Body element 64 is secured to the lower face of element 62 by means of a plurality of bolts 138 which pass through appropriate holes in element 64 to engage corresponding trapped holes in element 62. Preferably, a sealing gasket 140 is provided between the two elements 62 and 64 as shown. Element 64 is provided with a threaded throughbore 142 which is in alignment with the bore of element 62. Element 66 includes a partially threaded shank 144 which is threaded into the bore 142 of element 64. An O-ring seal 146 is lodged in a suitable groove extending around the outside of the unthreaded distal end of shank 144 to provide a seal between the two elements 62 and 66 as indicated. Disposed within the bore section 148 of element 66 is a generally tubular seat element 150. The upper end of seat element 150 is provided with a seat 152 against which the lower end of the head 132 of valve 114 may seat. Element 66 is provided with a threaded bore section 154 into which a threaded section 156 of element 68 is threaded. The distal end of the shank of element 68 protrudes upwardly through the bore of element 66 and a set of Belleville springs 158 is disposed between the upper end of element 68 and the lower end of seat element 150. Element 68 is adjusted to cause seat element 150 to be biased upwardly within the bore section 148 toward the head 132 of valve 114 with the flange which extends around the outside of element 150 at the lower end thereof abutting the shoulder within the bore of element 66. The amount of compression of the spring set 158 may be varied by the thickness of gasket 155 between element 68 and element 66 to thereby vary the downward force required to displace seat element 150 downwardly relative to element 66. A high pressure seal 160 is disposed in a suitable groove in element 66 to provide for sealing between the outside wall of seat element 150 and the inner wall of element 66. A drain port 162 is provided at the side of the lower end of element 66. Element 68 includes an axial passage 164 intersected by a radial passage 165 to provide communication of the drain 162 with the path defined by the inner diameters of seat element 150 and the Belleville springs 158 for a purpose hereinafter explained. A locking nut 166 is threaded onto the thread 144 of element 66 preparatory to threading of the latter into the threaded bore 154.

Once the desired adjustment of element 66 on element 64 has been attained, the locking nut 166 may be tightened against element 164 to lock the two elements 64, 66 in place. The adjustment of element 66 on element 64 is made in such a manner that spring-loaded seat 152 is disposed slightly below head 132 with the valve de-energized, (i.e., head 132 is not seated on seat 152). The distance between head 132 and seat 152 is small enough however that head 132 will seat at seat 152 when the valve is operated by energization of actuator 70. Any overtravel will be taken up by the downward displacement of seat element 150 against springs 158. The pretension imparted to springs 158 by the adjustment of element 68 ensures seating closure between head 132 and seat 152 on the downward displacement of element 150. In other words, the fuel pressure acting on seat element 150 is insufficient to open the path to drain when the valve is energized.

Figure 7A:
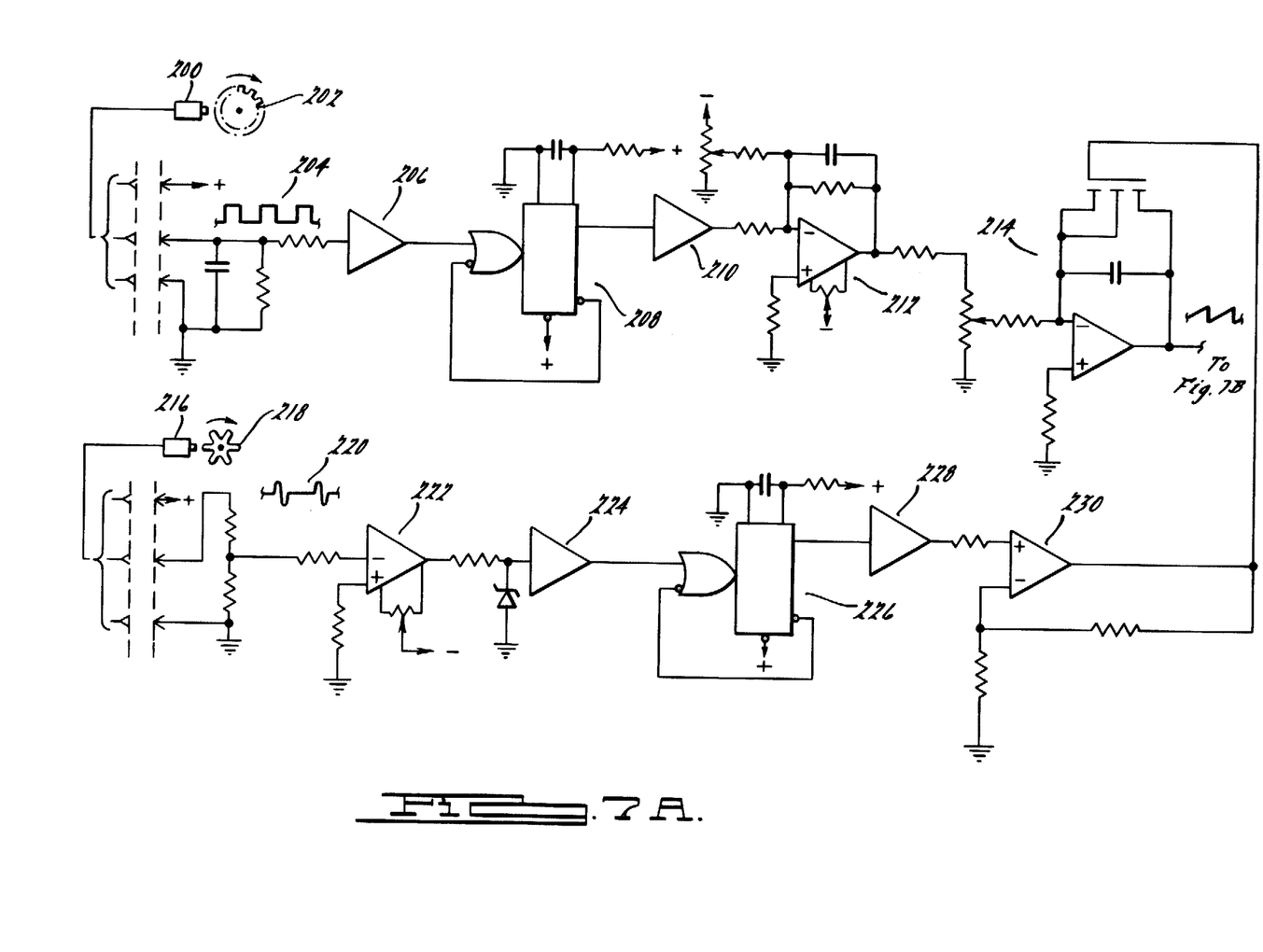
FIGS. 7A, 7B and 7C should be considered together and constitute a schematic diagram of electrical control system for controlling the valve of FIG. 2, in the operative system shown in FIG. 1.
Figure 7B:
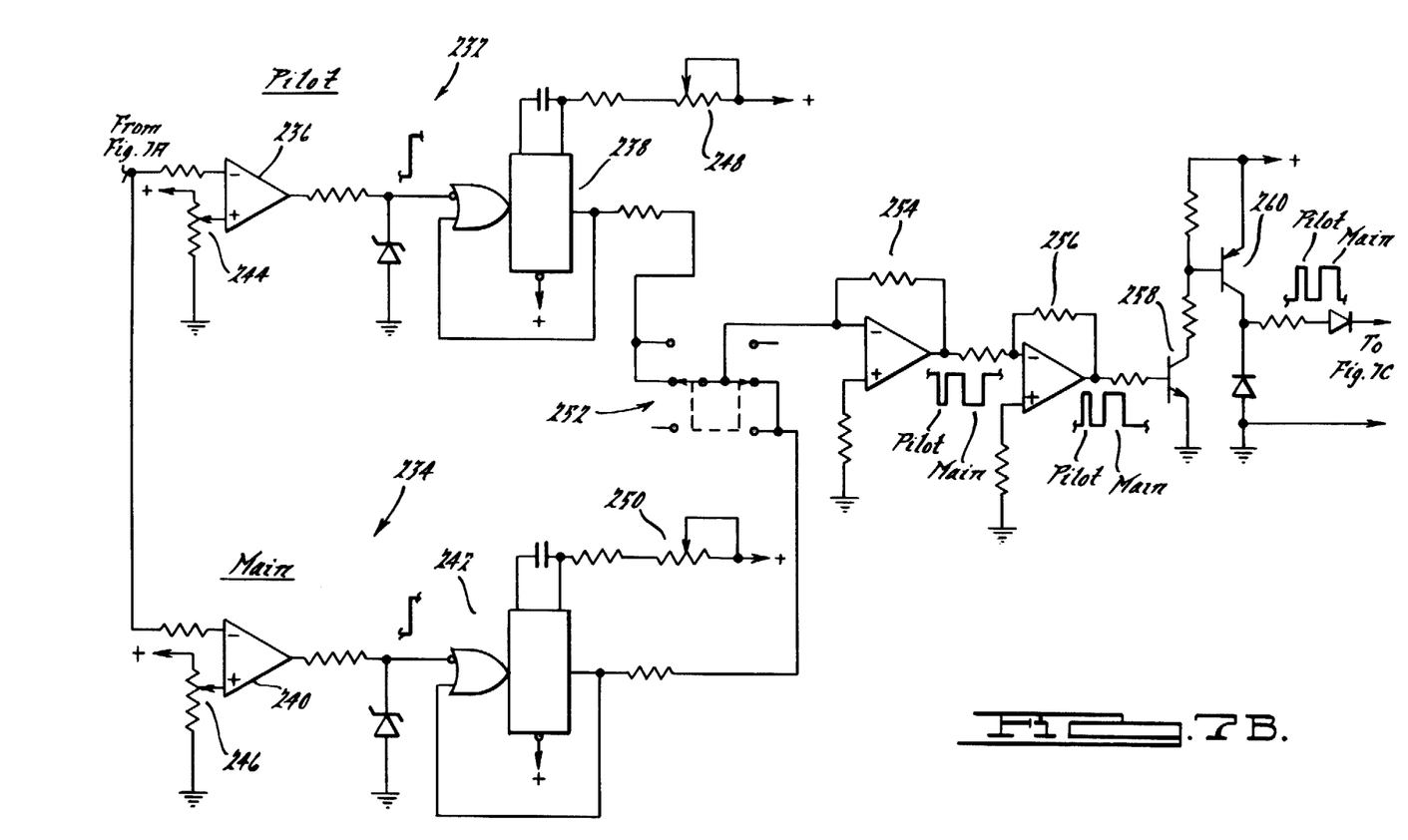
Figure 7C:
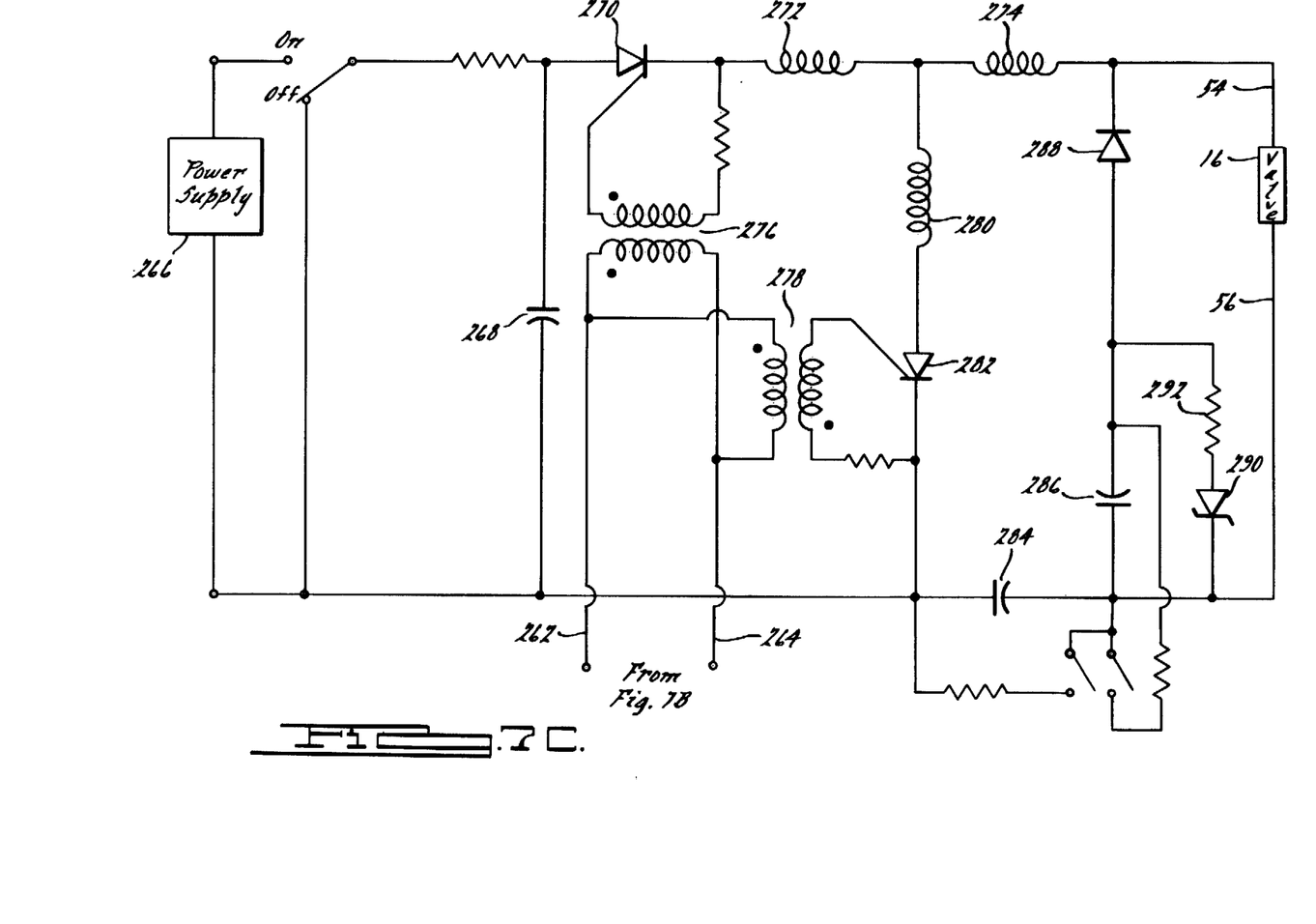

FIGS. 7A, 7B, and 7C illustrate an electrical control circuit for operating control valve 16. FIGS. 7A and 7B illustrate an electronic control unit. Turning first to FIG. 7A, a speed signal representative of the engine speed is developed by means of a transducer 200 disposed in proximity to the toothed flywheel 202 which rotates with the engine crankshaft. The disclosed transducer 200 is energized from a suitable DC power supply via two lead wires and a third lead wire supplies a pulse type signal waveform 204 as flywheel 202 rotates. The signal is composed of individual pulses with each pulse corresponding to one tooth. It will be appreciated that the frequency of the pulses of waveform 204 is therefore representative of the rotational speed of flywheel 202, and hence representative of engine speed. The waveform 204 is passed through a buffer circuit 206 to attenuate noise components which may be in the waveform. The buffered signal is then supplied to trigger a monostable, or one-shot, circuit 208. The one-shot circuit 208 is designed to produce a fixed time duration output pulse in response to the leading edge of each pulse of waveform 204. The fixed width of the monostable output pulse is, of course, less than the maximum anticipated frequency of the waveform 204. By thus providing a fixed duration output pulse, a rectangular pulse train waveform is developed at the output of one-shot 208 wherein the average value of the waveform is representative of engine speed. The waveform from one-shot 208 is passed through another buffer circuit 210 to remove noise and the buffered signal is supplied as an input to a velocity amplifier circuit 212. The velocity amplifier circuit serves to develop a DC output voltage whose magnitude is proportional to the average value of the buffered signal received from the buffer 210, and hence representative of the speed of the engine. The signal level from the velocity amplifier 212 is supplied to an integrator circuit 214. The integrator circuit 214 serves to integrate the velocity signal and thereby tend to develop a ramp type voltage. However, the integrator is reset at predetermined intervals whereby the signal appearing at the output of the integrator assumes a sawtooth shape as shown in the drawing.

The circuit for resetting the integrator circuit comprises a series of stages which are driven from a magnetic pick-up 216 and rotary cam 218. The rotary cam 218 comprises a number of lobes equal to the number of cylinders in the engine with which the circuit is used, and is synchronized with engine rotation to cause the transition of each lobe of the cam 218 past the pickup device 216 in timed relationship with the operation of the pistons in their respective cylinders. The pick-up device 216 is energized from a DC supply and develops a signal waveform 220 which is utilized to reset the integrator. As each lobe sweeps past the pick-up device 216, there is a sharp transition in the signal and this occurs in the middle of each of the bi-polar pulses constituting the waveform 220. It is this specific transition which causes the integrator to be reset. Signal 220 is supplied to a pulse amplifier and limiter circuit 222 and thence to a buffer circuit 224. Each transition in the waveform 220 creates a similar transition at the output of buffer 224. The signal from buffer 224 trips a second one-shot 226. Desirably, the widths of the pulses of this one-shot are narrow in relation to the angular range represented by the frequency of the pulses at maximum engine speed to promote maximum accuracy in resetting the integrator. The one-shot pulses are supplied through a buffer 228 and a pulse amplifier 230 to reset the integrator circuit 214.

The sawtooth signal from integrator 214 is supplied to both a pilot stage circuit 232 and a main stage circuit 234. (See FIG. 7B.) The pilot stage circuit 232 includes a comparator circuit 236 and a one-shot circuit 238. Likewise the main stage circuit includes a comparator circuit 240 and a one-shot circuit 242. A pilot crank angle control 244 is associated with comparator 236 and a main pulse crank angle control 246 is associated with comparator 240. Normally, the adjustment of the pilot crank angle control provides a less positive voltage reference to the non-inverting input of comparator 236 than does the main crank angle control to the corresponding input of comparator 240.

Figure 8:
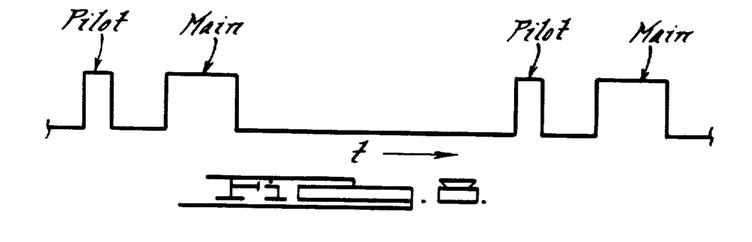
FIG. 8 is a waveform illustrating operation of the valve of FIG. 2 in the system of FIG. 1.

If it is assumed that the sawtooth is beginning a ramp cycle, a point will be reached where there is a coincidence between the pilot crank angle control signal and the sawtooth. This causes the comparator output 236 to swing, and in turn causes one-shot 238 to deliver an output pulse. The width of the output pulse of one-shot 238 is controlled by a pulse width control 248. As will be seen, the pulse width output of one-shot 238 causes valve 16 to open and supply a corresponding pilot pulse of fuel to the appropriate cylinder of the engine. As the sawtooth continues to ramp a point is next reached where coincidence is achieved between the main crank angle control signal and the sawtooth. This causes the output of comparator 240 to swing and hence causes one-shot 242 to produce an output pulse. The output pulse of one-shot 242 has a width determined by a pulse width control adjustment 250. The pulse width control adjustment 250 is normally set to produce a wider pulse than does the pulse width control 248 of the pilot pulse circuit. Accordingly, the output pulse of one-shot 242 causes valve 16 to open for a considerably longer duration than did the pulse from one-shot 238 whereby the pilot pulse of injected fuel is followed by a subsequent main injection of a considerably larger amount of fuel. (See FIG. 8).

A selector switch 252 is provided whereby the injector may be selectively controlled in accordance either with the pilot pulse, the main pulse or both pulses. For the particular selection setting of switch 252, the selected signal (or signals) is (or are) supplied further to a summing and inverting amplifier 254 and from there to an inverting amplifier 256. With this arrangement the occurrence of either a main pulse or a pilot pulse or both at the input of amplifier 254 will produce a corresponding main or pilot pulse or both at the output of inverting amplifier 256. Each output pulse from amplifier 256 is supplied to a power amplifier stage 260. The power amplifier stage is in turn coupled to a high voltage pulse supply unit for actuating the electro-expansive element 70 of valve 16.

The high voltage pulse supply unit is shown in FIG. 7C. This circuit includes input leads 262, 264 which are coupled to power amplifier stage 260 to receive the output pulse from the electronic control unit. In order to actuate the piezoelectric element forming the electro-expansive actuator 70 it is necessary that a source of fairly high potential be available. Such a source is designated by the reference numeral 266 in FIG. 7C. By way of example, this source may be constructed in accordance with known techniques to develop a high voltage from a device which may be driven by the engine, such as an alternator with appropriate regulating and rectifying circuitry for developing a high potential suitable for actuating the piezoelectric stack. Because the piezoelectric stack is energized only on an intermittent basis, thereby having a relatively short duty cycle, it is desirable to utilize a capacitor 268 across the power supply which may be charged to the desired potential during the portion of the cycle preceding the firing of the stack. The charge developed across the capacitor is utilized to energize the piezoelectric stack which may require an operating voltage such as approximately 1000 volts DC. The unique arrangement of the high voltage pulse supply shown in FIG. 7C is such that the 1000 volt potential required for the stack can be developed with a lesser voltage across capacitor 268, for example in the range of 400 to 450 volts DC. Connected between capacitor 268 and the stack is a circuit including an SCR 270 and a pair of inductors 272, 274. The gate-cathode circuit of SCR 270 is coupled via a coupling transformer 276 to receive the signal from the electronic control unit supplied via leads 262, 264. It will be appreciated that the windings of the transfer 276 are so connected in relation to the lines 262, 264 that the positive pulse supplied by the output of power amplifier 260 causes SCR 270 to be switched into conduction. With SCR 270 in conduction, the charge on capacitor 268 is drawn as current through the SCR and the inductors 272, 274 to energize the stack. It has been found that the rate of voltage rise across the stack should be controlled within certain limits to avoid arcing between the positive and negative electrodes which are interleaved with the discs in the stack. Such arcing, if not prevented, can lead to early failure of the stack. The rise time of the 1000 volt pulse energizing signal which is developed across the stack is limited by the characteristics of the inductors 272, 274. As the stack is energized, a large expansive force is almost instantly developed to open the control valve 16 so that an injection of fuel to the cylinder can occur. The trailing edge of the pulse supplied from the power amplifier circuit 260 is utilized to de-energize the piezoelectric stack. For this purpose another transformer 278 is connected with the leads 262, 264. A discharge circuit which includes an inductor 280 and another SCR 282 is connected in circuit as shown. The coupling between the primary and secondary of transformer 278 is opposite that of transformer 276 so that the trailing edge of the pulse from power amplifier 260 causes SCR 282 to switch into conduction. When SCR 282 is in conduction, there is a charge on the piezoelectric stack because the stack electrically exhibits a capacitance characteristic. The charge is drawn from the stack through the inductors 274 and 280 and through the SCR 282. The inductor 280 serves to assist in energy storage rather than dissipating energy as heat. Additional storage capacitors 284, 286 are also connected in circuit as shown and these serve to store a portion of energy which was utilized to actuate the piezoelectric stack. The capacitors 284 and 286 along with the diode 288 are connected in circuit as illustrated to provide for this additional energy storage. A voltage limiter comprising a zener diode 290 and a resistor 292 are connected across the capacitor 286 to limit the maximum charge which can be held by that capacitor, and thus limit the maximum reverse voltage across the stack to a safe level. The arrangement is such that once the circuit has been energized and begins to cycle, only a portion of the energy required to actuate the stack is drawn from capacitor 268 during each cycle, the remainder being supplied by the capacitor 284 since it will tend to aid the charging of the stack when it is desired to energize the valve. The configuration of the inductors 272, 274, and 280 achieves optimum performance for both charging and discharging the stack. Both capacitors 284 and 286 are shunted by respective resistors which may be switched into the circuit during testing procedures to avoid shock to the personnel who may be testing the circuit.

In operation of the system, pump and distributor assembly 12 is driven by the engine to supply pressurized fuel via valve 22 and surge tank 24 to inlet port 134 of control valve 16. The control circuit energizes the control valve at the appropriate time to cause an amount of fuel to pass through the control valve and via line 46 back to the distributor position of assembly 12 which at that instant is establishing communication with the appropriate injector 14. Thus, a pilot pulse, followed by a main pulse, of fuel is injected into the appropriate cylinder. When valve 16 is de-energized, excess pressure in the circuit between the outlet 136 and the injector is relieved by fluid flow back through valve 16 to drain 162. Because the stack 70 experiences a high duty cycle, it tends to heat up rapidly. The cooling of the stack by the circulation of liquid fuel through space 88 via lines 32 and 30 prevents shortening of the valve stroke which would otherwise occur upon overheating of the stack and thereby avoids increased pressure drop between inlet 134 and outlet 136 which would occur with such shortening of the stroke. While it is fully contemplated that the system of the instant invention can be used to start the engine, it may be advantageous to incorporate a separate conventional start system in certain instances which would be used only during the starting phase of operation until the engine is running fast enough to drive the pump and distributor assembly 12 so that suitable line pressures can be developed.

What is claimed is:

1. A fuel injection system control valve comprising:
   a valve body having an inlet connected to a source of high pressure fuel and being in fluid communication with a first chamber, an outlet connected to a fuel injector and in fluid communication with a second chamber, and a drain connected to a fuel dump and in communication with a third chamber;
   a valve seat element disposed between said outlet and said drain; said valve seat having spring biasing means associated therewith to bias said valve seat towards said first chamber and positioning means to hold and position said valve seat to a predetermined position within the valve body;
   a valve element controlling fuel flow between the three chambers said valve element having an enlarged head located within said second chamber, said valving element being normally biased into a first closed position blocking said first chamber from said second chamber which prevents flow from said inlet to said outlet and allows flow between said second and said third chamber, and a second open position wherein said valve element is in contact with said valve seat blocks said second chamber from said third chamber and allows fuel flow from said inlet through first chamber to said second chamber and out said outlet;
   means to move said valve element from said first position to said second position into contact with said valve seat.

2. A fuel injection system control valve as claimed in claim 1 wherein said valve includes an electro-expansive actuator element for operating said valve element between its open and closed positions.

3. A fuel injection system control valve as claimed in claim 1 including means for adjusting the bias force of said spring means.

4. A fuel injection control valve as claimed in claim 3 wherein said valve seat element is generally tubular in shape and includes a seat at one end thereof against which said valve element is adapted to seat when the latter is actuated to its open position, said spring means being disposed at the opposite end of said tubular valve seat element.

* * * * *